(12) United States Patent
Yokoi

(10) Patent No.: US 11,704,786 B2
(45) Date of Patent: Jul. 18, 2023

(54) STRESS LUMINESCENCE MEASUREMENT METHOD AND STRESS LUMINESCENCE MEASUREMENT DEVICE

(71) Applicant: Shimadzu Corporation, Kyoto (JP)

(72) Inventor: Yusuke Yokoi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 39 days.

(21) Appl. No.: 17/219,186

(22) Filed: Mar. 31, 2021

(65) Prior Publication Data
US 2021/0312608 A1 Oct. 7, 2021

(30) Foreign Application Priority Data

Apr. 2, 2020 (JP) ................................ 2020-066648

(51) Int. Cl.
| | | |
|---|---|---|
| G06T 7/00 | (2017.01) | |
| G06T 7/60 | (2017.01) | |
| G01L 1/24 | (2006.01) | |
| G01N 21/88 | (2006.01) | |

(52) U.S. Cl.
CPC .............. *G06T 7/0006* (2013.01); *G01L 1/24* (2013.01); *G01N 21/8851* (2013.01); *G06T 7/60* (2013.01); *G06T 2207/10152* (2013.01); *G06T 2207/30148* (2013.01); *G06T 2207/30204* (2013.01)

(58) Field of Classification Search
USPC ............... 382/141; 73/800; 356/32; 348/125
See application file for complete search history.

(56) References Cited

U.S. PATENT DOCUMENTS

| | | | | |
|---|---|---|---|---|
| 5,817,945 A | * | 10/1998 | Morris ...................... | G01L 1/24 73/762 |
| 6,943,869 B2 | * | 9/2005 | Hubner ................... | G01L 1/241 356/34 |
| 9,085,052 B1 | * | 7/2015 | Georgeson ............. | G01B 15/06 |
| 9,395,308 B2 | * | 7/2016 | Yun ........................... | G01L 1/24 |

(Continued)

FOREIGN PATENT DOCUMENTS

| | | |
|---|---|---|
| JP | 2007510913 A | 4/2007 |
| JP | 2015075477 A | 4/2015 |
| JP | 2019-039743 A | 3/2019 |

OTHER PUBLICATIONS

Notification of Reasons for Refusal dated May 9, 2023 for corresponding Japanese Patent Application JP2020-066648 and English-language machine translation thereof.

*Primary Examiner* — Kathleen Y Dulaney
(74) *Attorney, Agent, or Firm* — Muir Patent Law, PLLC

(57) ABSTRACT

A stress luminescence measurement method according to one aspect includes the steps of: placing a stress luminescent material on a surface of a sample; irradiating the stress luminescent material with excitation light; acquiring a first captured image by imaging the stress luminescent material during irradiation of the excitation light; applying a load to the sample; acquiring a stress luminescence image by imaging stress luminescence of the stress luminescent material; irradiating the stress luminescent material after removal of the load with the excitation light; acquiring a second captured image during irradiation of the excitation light by imaging the stress luminescent material in a state in which the load has been removed; and storing the first captured image and the second captured image in a memory in association with the stress luminescent image.

6 Claims, 13 Drawing Sheets

(56) References Cited

U.S. PATENT DOCUMENTS

| | | | |
|---|---|---|---|
| 9,873,527 B2* | 1/2018 | DeGaetano | B64F 5/60 |
| 10,378,977 B2* | 8/2019 | Sakamoto | G01L 1/24 |
| 2001/0008445 A1* | 7/2001 | Ifju | G01B 11/20 |
| | | | 356/32 |
| 2001/0017059 A1* | 8/2001 | Xu | G01L 1/24 |
| | | | 73/800 |
| 2005/0036151 A1* | 2/2005 | Gornick | G01N 21/45 |
| | | | 356/497 |
| 2005/0168139 A1* | 8/2005 | Xu | H01L 41/08 |
| | | | 313/506 |
| 2008/0179539 A1* | 7/2008 | Rasnow | G01N 21/6454 |
| | | | 250/458.1 |
| 2008/0236294 A1* | 10/2008 | Woo | G01L 1/24 |
| | | | 73/800 |
| 2009/0286076 A1* | 11/2009 | Xu | G01M 11/081 |
| | | | 252/301.36 |
| 2012/0100666 A1* | 4/2012 | Gee | H01L 21/681 |
| | | | 257/E31.124 |
| 2012/0262715 A1* | 10/2012 | Sakai | G01N 21/21 |
| | | | 356/369 |
| 2013/0063570 A1* | 3/2013 | Michopoulos | G01B 11/165 |
| | | | 348/47 |
| 2013/0082191 A1* | 4/2013 | Raghavan | C09K 11/02 |
| | | | 252/301.36 |
| 2013/0222574 A1* | 8/2013 | Nakagaki | G06T 7/0004 |
| | | | 348/125 |
| 2015/0082920 A1* | 3/2015 | Haick | G01L 19/0092 |
| | | | 73/865.8 |
| 2015/0103333 A1* | 4/2015 | Yun | G01N 21/91 |
| | | | 356/32 |
| 2015/0253229 A1* | 9/2015 | Grondin | G06T 7/254 |
| | | | 382/107 |
| 2015/0267107 A1* | 9/2015 | Zhu | G01L 1/247 |
| | | | 252/301.36 |
| 2016/0216166 A1* | 7/2016 | Kwon | G01L 1/246 |
| 2017/0016867 A1* | 1/2017 | Chung | G01N 33/0036 |
| 2017/0307360 A1* | 10/2017 | Imai | G01M 5/005 |
| 2019/0368988 A1* | 12/2019 | Ju | G06T 7/0004 |
| 2020/0124487 A1* | 4/2020 | Okoli | G01N 21/70 |
| 2020/0174291 A1* | 6/2020 | Choi | H04R 1/08 |

\* cited by examiner

STRESS LUMINESCENCE MEASUREMENT METHOD AND STRESS LUMINESCENCE MEASUREMENT DEVICE

CROSS-REFERENCE TO RELATED APPLICATIONS

This application claims priority under 35 U.S.C. § 119 to Japanese Patent Application No. 2020-066648 filed on Apr. 2, 2020, the entire disclosure of which is incorporated herein by reference in its entirety.

BACKGROUND OF THE INVENTION

Field of the Invention

The present invention relates to a stress luminescence measurement method and a stress luminescence measurement device.

Background of the Invention

A flexible device is a device in which a semiconductor element, a light emitting element, or the like is formed on a flexible substrate, such as, e.g., a resin substrate, and typically includes a lighting device, a display, and a sensor. In recent years, various products provided with a foldable or bendable flexible display have been developed.

As one example of a flexible display mounted product, a foldable portable terminal (a smartphone, a tablet, etc.) is known. In such a portable terminal, a flexible display is a touch panel display and has a display and an input unit for accepting user operations.

In the development site of a folding type portable terminal, the durability and the performance of a sample are generally verified by repeatedly performing a folding test of a sample several tens of thousands of times to several hundreds of thousands of times using a deformation test device as shown in, for example, Japanese Unexamined Patent Application Publication No. 2019-39743.

SUMMARY OF THE INVENTION

In the above-described folding test, when a defect occurs in a sample, strain is generated in the periphery of the defect, and there is a possibility of the breakage of the sample. Recently, as a technique for detecting such a defect, a technique utilizing a stress luminescent material has been proposed. Specifically, a light-emitting film including a stress luminescent material is placed on a sample, and an external force is applied to the light-emitting film together with the sample to emit light of the stress luminescent material. The defect of the sample can be detected by measuring the luminescence.

However, in the case of detecting a defect using a stress luminescent material, since the light emission from the sample is measured in a light-shielded state, although the timing at which the defect of the sample occurs can be detected, it is difficult to accurately detect the change in the appearance of the sample caused by the defect. Therefore, there is a concern that the defect occurrence position may be erroneously detected.

In order to accurately detect the defect occurrence position, it is required to perform the image analysis processing, etc., of the stress luminescence image. Therefore, there is a concern that the defect occurrence point cannot detect by a simple method.

The present invention has been made to solve the above-described problems. An object thereof is to provide a stress luminescence measurement method and a stress luminescence measurement device capable of accurately and easily grasping an external change of a stress luminescent material caused by a defect of a sample.

A stress luminescence measurement method according to a first aspect of the present invention, includes the steps of:

placing a stress luminescent material on a surface of a sample;

irradiating the stress luminescent material with excitation light;

acquiring a first captured image by imaging the stress luminescent material during irradiation of the excitation light;

applying a load to the sample;

acquiring a stress luminescence image by imaging stress luminescence of the stress luminescent material;

irradiating the stress luminescent material after removal of the load with the excitation light;

acquiring a second captured image during irradiation of the excitation light by imaging the stress luminescent material in a state in which the load has been removed; and storing the first captured image and the second captured image in a memory in association with the stress luminescent image.

A stress luminescence measurement device according to a second aspect of the present invention measures luminescence of a stress luminescent material placed on a surface of a sample. The stress luminescence measurement device is provided with: a light source configured to irradiate the stress luminescent material with excitation light; a load application mechanism configured to apply a load to the sample; a camera configured to image the stress luminescent material; a controller configured to control the light source, the load application mechanism, and the camera; and a memory. The controller is configured to acquire a first captured image by imaging the stress luminescent material during irradiation of the excitation light. The controller is configured to acquire the stress luminescence image by imaging stress luminescence of the stress luminescent material. The controller is configured to irradiate the stress luminescent material in which the load has been removed with the excitation light. The controller is configured to acquire a second captured image by imaging, during irradiation of excitation light, the stress luminescent material in a state in which the load has been removed. The controller is configured to store the first captured image and the second captured image in the memory in association with the stress luminescent image.

The above-described objects and other objects, features, aspects, and advantages of the present invention will become apparent from the following detailed descriptions of the invention that can be understood with reference to the attached drawings.

DESCRIPTION OF THE PREFERRED EMBODIMENT

Figure 1:
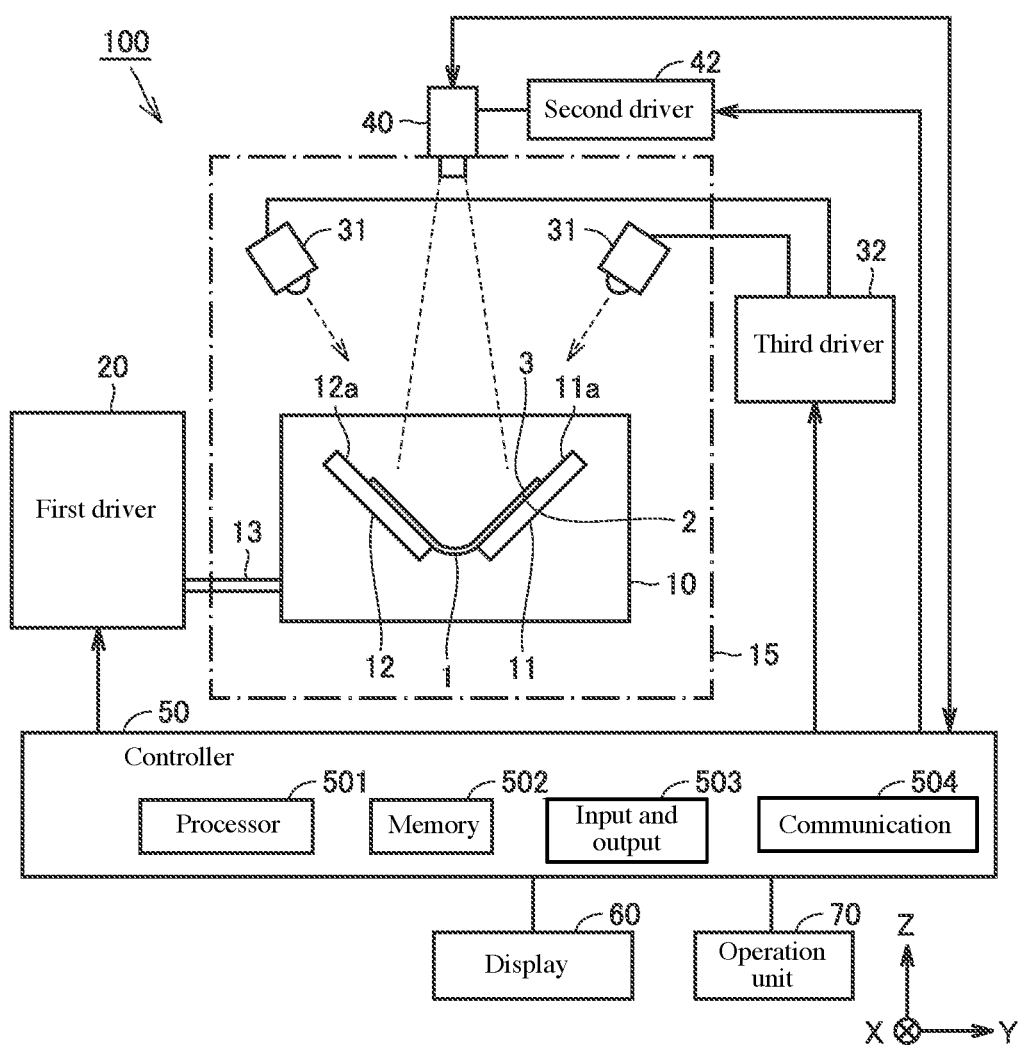
FIG. 1 is a block diagram illustrating the entire configuration of a stress luminescence measurement device according to an embodiment.

Hereinafter, some embodiments of the present invention will be described in detail with reference to the attached drawings. The same or corresponding portion in the drawing is denoted by the same reference numeral, and the description thereof will not be repeated.

<Configuration of Stress Luminescence Measurement Device>

FIG. 1 is a block diagram illustrating the entire configuration of a stress luminescence measurement device according to an embodiment. The stress luminescence measurement device 100 according to this embodiment is a device for measuring the stress (strain) generated in a test object (hereinafter, also simply referred to as "sample") by using light emission phenomena of a stress luminescent material. The stress luminescence measurement device 100 can also be used to test the durability to the stress generated in a sample.

In the embodiment of FIG. 1, the sample is flexible. The sample is, for example, a flexible device or a member mountable on a flexible device (e.g., a protective sheet of a display). In the example of FIG. 1, the flexible device is a flexible display 2 to be mounted on a foldable smartphone 1. In the smartphone 1, the flexible display 2 is a touch panel display and has a display and an input unit for receiving user operations. Note that the sample is not limited to one having flexibility.

On the surface of the flexible display 2, a stress luminescent material 3 is placed. The stress luminescent material 3 is a stress luminescent sheet containing, for example, a stress luminescent material and is placed at least on a predetermined area of the flexible display 2. This predetermined area is set to include an area (i.e., a deformation area of the flexible display 2) where a stress is applied during the folding operation of the smartphone 1. Therefore, when folding the smartphone 1, a stress is applied to the stress luminescent material 3 together with the smart phone 1, and a deformation (strain) is generated.

The stress luminescent material 3 is a member that emits light by a mechanical stimulus from the outside, and a conventionally known member can be used. The stress luminescent material 3 has a property of emitting light by the strain energy applied externally, and the light emission intensity varies according to the strain energy. The stress luminescent material 3 contains, for example, a material selected from the group consisting of strontium aluminate, zinc sulfide, barium titanate, silicates and phosphates.

The stress luminescence measurement device 100 is provided with a load application mechanism for applying a load to the flexible display 2 of the folding smartphone 1. The load application mechanism is configured to reproducibly reproduce the load applied to the flexible display 2 during the folding operation of the smartphone 1.

Specifically, the load application mechanism has a holder 10 and a first driver 20. The holder 10 supports the smartphone 1 so that the flexible display 2 is positioned on the upper side of FIG. 1. The first driver 20 is configured to fold the smartphone 1 by transitioning the holder 10 between a first posture and a second posture. For example, a deformation test device disclosed in Japanese Unexamined Patent Application Publication No. 2019-39743 can be applied to such a load application mechanism.

In the embodiment of FIG. 1, the holder 10 has a first mounting plate 11, a second mounting plate 12, and a drive shaft 13. The first mounting plate 11 has a rectangular main surface 11a. The second mounting plate 12 has a rectangular main surface 12a. The smartphone 1 is attached to the main surface 11a and the main surface 12a by bonding the back surface thereof (the surface opposed to the flexible display 2).

The first driver 20 is attached to the base of the drive shaft 13. The drive shaft 13 is rotatably supported with its central axis parallel to the X-axis. The first driver 20 includes a motor, a transmission, and a controller (not shown) therein to rotate the drive shaft 13 forward and backward about its central axis with a predetermined rotational angle and rotational speed. Note that the rotation angle and the rotation speed of the drive shaft 13 is variable. Thereby, it is possible to appropriately change the bending angle and the folding speed in the folding test of the smartphone 1 to be described later.

The second mounting plate 12 is non-rotatably mounted to the drive shaft 13. The second mounting plate 12 rotates with the rotation of the drive shaft 13. When the second mounting plate 12 rotates, the first mounting plate 11 also rotates.

Figure 2:
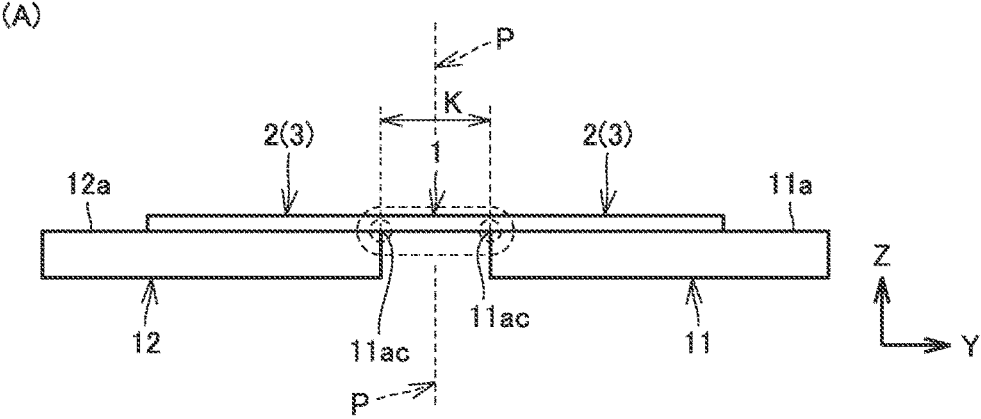
FIG. 2 is a diagram showing a configuration example of a load application mechanism.
Figure 2:
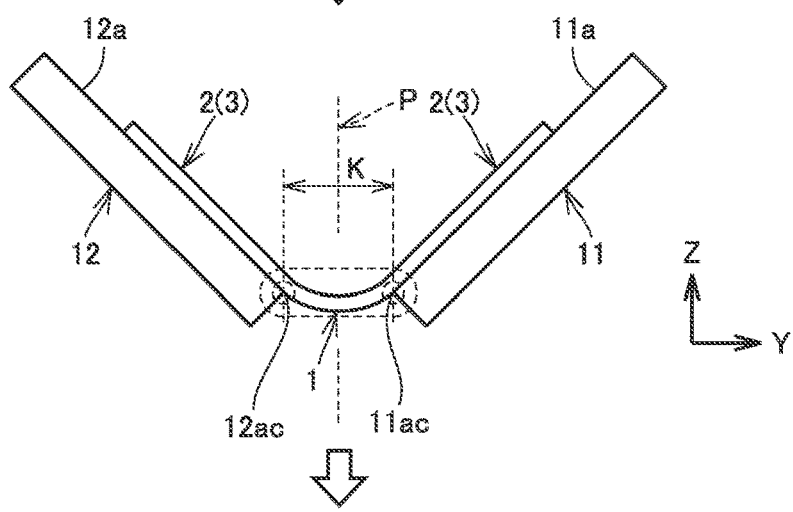
Figure 2:
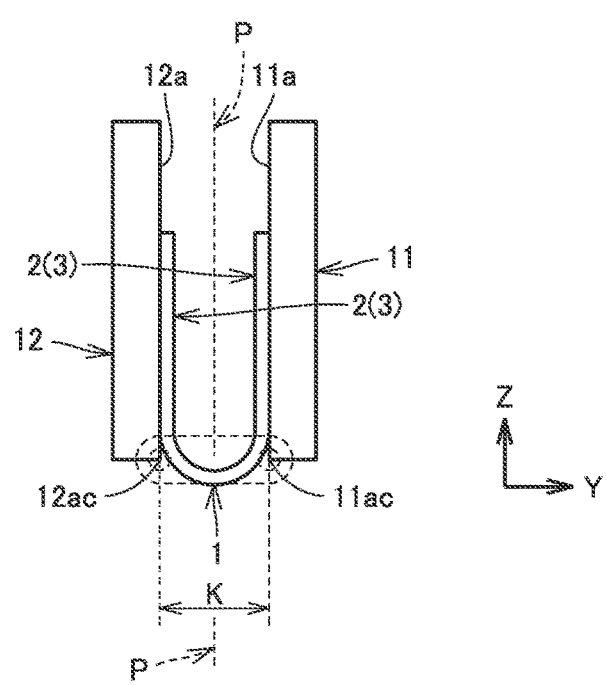

FIG. 2 is a diagram for explaining the operation of the load application mechanism shown in FIG. 1. FIG. 2 shows a view of the first mounting plate 11, the second mounting plate 12, and the smartphone 1 attached thereto as viewed in the X-axis direction. (B) and (C) of FIG. 2 show states in which the smartphone 1 is folded from the state of (A) of FIG. 2. The smartphone 1 is provided with a flexible display 2 and a stress luminescent material 3 placed on the flexible display 2.

When the drive shaft 13 is rotated in the positive direction (clockwise direction) about its central axis by the first driver 20 from the state of (A) of FIG. 2, as shown in (B) and (C) of FIG. 2, the smartphone 1 attached to the main surface 12a and the main surface 11a is bent centering the end portion 12ac and the end portion 11ac which are parallel to each other and the distance K therebetween is constant, between the main surface 12a and the main surface 11a which rotates in a plane symmetrical with respect to the plane P. Therefore, the smartphone 1 is bent by substantially the same bending radius in the vicinity of the end portion 12ac, in the vicinity of the end portion 11ac, and between the end portions 11ac and 12*ac*. According to this, since the bending condition is hardly deviated unexpectedly depending on the position of the smartphone 1, a highly reproducible test can be performed.

Further, the load application mechanism of FIG. 1 rotates the main surface 12*a* and the main surface 11*a* with the end portion 12*ac* and the end portion 11*ac* about the end portion 12*ac* and the end portion 11*ac* in a state in which the end portion 12*ac* and the end portion 11*ac* are maintained in parallel and the distance K is kept constant. Therefore, the portion of the smartphone 1 positioned between the vicinity of the end portion 12*ac* and the vicinity of the end portion 11*ac* is deformed, but the remaining portion of the smartphone 1 is not substantially deformed. This selectively deforms the portion to be subjected to the deformation test, thereby realizing an accurate and highly reproducible deformation test.

Note that from the folding state of the smartphone 1 ((C) of FIG. 2), when rotating the drive shaft 13 in the opposite direction (counterclockwise direction) by the first driver 20, the state returns to the state of (A) of FIG. 2 via the state of (B) of FIG. 2. In this manner, by rotating the drive shaft 13 in the forward direction to change the state from the state of (A) (the smartphone 1 is in a flat state) to the state of (C) of FIG. 2 (the smartphone 1 is in a folded state), and then rotating the drive shaft 13 in the reverse direction to change the state from the state of (C) of FIG. 2 to the state of (A) of FIG. 3 (corresponding to one measurement set), the smartphone 1 is folded from the flat state and then returned to the flat state again. Thus, the smartphone 1 can be subjected to the test for folding the smartphone 1 once. By alternately rotating the drive shaft 13 in the forward and reverse directions, the folding test of the smartphone 1 can be repeatedly performed.

Returning to FIG. 1, the stress luminescence measurement device 100 is further provided with light sources 31, a housing 15, a camera 40, a second driver 42, a third driver 32, and a controller 50.

The light source 31 is disposed above the flexible display 2 of the smartphone 1 and is configured to illuminate excitation light with respect to the stress luminescent material 3. Upon receiving the excitation light, the stress luminescent material 3 transitions to the light emitting state. The excitation light is, for example, ultraviolet or blue light. In the example of FIG. 1, it is configured to emit the excitation light to the stress luminescent material 3 from two directions. But, the light source 31 may be configured to emit the light with respect to the stress luminescent material 3 from one direction or three or more directions.

The holder 10 and the light source 31 are accommodated in the housing 15. In a state in which the light source 31 is not energized, the housing 15 can be a dark room. The light source 31 is an excitation light source and may function as as an illumination light source in the housing 15.

The third driver 32 provides the power for driving the light source 31. The third driver 32 can control the light amount of the excitation light emitted from the light source 31 and the irradiation time of the excitation light, by controlling the power supplied to the light source 31 in response to the command received from the controller 50.

The camera 40 is positioned above the flexible display 2 of the smartphone 1 so as to include the stress luminescent material 3 positioned in the predetermined area of the flexible display 2 in the imaging field of view. In the embodiment of FIG. 1, the camera 40 is mounted on the ceiling surface of the housing 15. Specifically, the camera 40 is positioned such that the focusing position is positioned at at least one point within the predetermined area of the flexible display 2. Preferably, the at least one point in the predetermined area is positioned at the bending center of the flexible display 2.

The camera 40 includes optical elements, such as, e.g., a lens and an imaging element. The imaging element is realized by, for example, a CCD (Charge Coupled Device) sensor, or a CMOS (Complementary Metal Oxide Semiconductor) sensor. The imaging element generates a captured image by converting the light incident from the stress luminescent material through the optical system into an electric signal.

The camera 40 is configured to image the stress luminescent material 3 during the irradiation of the excitation light when exciting the stress luminescent material 3 by the excitation light of the light source 31. That is, the camera 40 is configured to image the stress luminescent material 3 in a state in which no load is applied by utilizing the excitation light as the illumination light.

The camera 40 is configured to image the light emission of the stress luminescent material 3 positioned in the predetermined area at the time of the load application to the flexible display 2 (i.e., when folding the smartphone 1). The image data generated by the imaging by the camera 40 is transmitted to the controller 50.

The second driver 42 is configured to be capable of changing the focusing position of the camera 40 in response to the command received from the controller 50. Specifically, the second driver 42 can adjust the focusing position of the camera 40 by moving the camera 40 along the Z-axis direction and the Y-axis direction shown in FIG. 2. For example, the second driver 42 is provided with a motor for rotating the feed screw for moving the camera 40 in the Z-axis direction and the Y-axis direction and a motor driver for driving the motor. By rotary driving the feed screw by the motor, the camera 40 is positioned at a specified position within the predetermined range in each of the Z-axis direction and the Y-axis direction. The second driver 42 transmits the positional information indicating the position of the camera 40 to the controller 50.

The controller 50 controls the entire stress luminescence measurement device 100. The controller 50 has, as its main components, a processor 501, a memory 502, an I/O interface (I/F) 503, and a communication I/F 504. These units are connected to each other via a bus (not shown) to be able to communicate with each other.

The processor 501 is typically an arithmetic processing unit, such as, e.g., a CPU (Central Processing Unit) or an MPU (Micro Processing Unit). The processor 501 controls the operation of each unit of the stress luminescence measurement device 100 by reading out and executing a program stored in the memory 502. Specifically, the processor 501 executes the program, thereby realizing each of the processing of the stress luminescence measurement device 100, which will be described later. In the example of FIG. 1, a configuration in which the processor is configured by a single processor is illustrated, but the controller 50 may be configured to include a plurality of processors.

The memory 502 is realized by a non-volatile memory, such as, e.g., a RAM (Random Access Memory), a ROM (Read Only Memory), and a flash memory. The memory 502 stores programs to be performed by the processor 501, data to be used by the processor 501, or the like.

The input/output I/F 503 is an interface for exchanging various data between the processor 501, the first driver 20, the third driver 32, the camera 40, and the second driver 42.

The communication I/F 504 is a communication interface for exchanging various types of data between the stress luminescence measurement device 100 and other devices and is realized by adapters, connectors, or the like. The communication method may be a wireless communication method, such as, e.g., a wireless LAN (Local Area Network), and a wired communication method using a USB (Universal Serial Bus).

To the controller 50, the display 60 and the operation unit 70 are connected. The display 60 is configured by a liquid crystal panel capable of displaying images. The operation unit 70 accepts the operation input of the user with respect to the stress luminescence measurement device 100. The operation unit 70 is typically configured by a touch panel, a keyboard, a mouse, and the like.

The controller 50 is in communication with the first driver 20, the third driver 32, the camera 40, and the second driver 42. The communication between the controller 50, the first driver 20, the third driver 32, the camera 40, and the second driver 42 may be realized by radio communication or wired communication.

<Functional Configuration of Controller 50>

Figure 3:
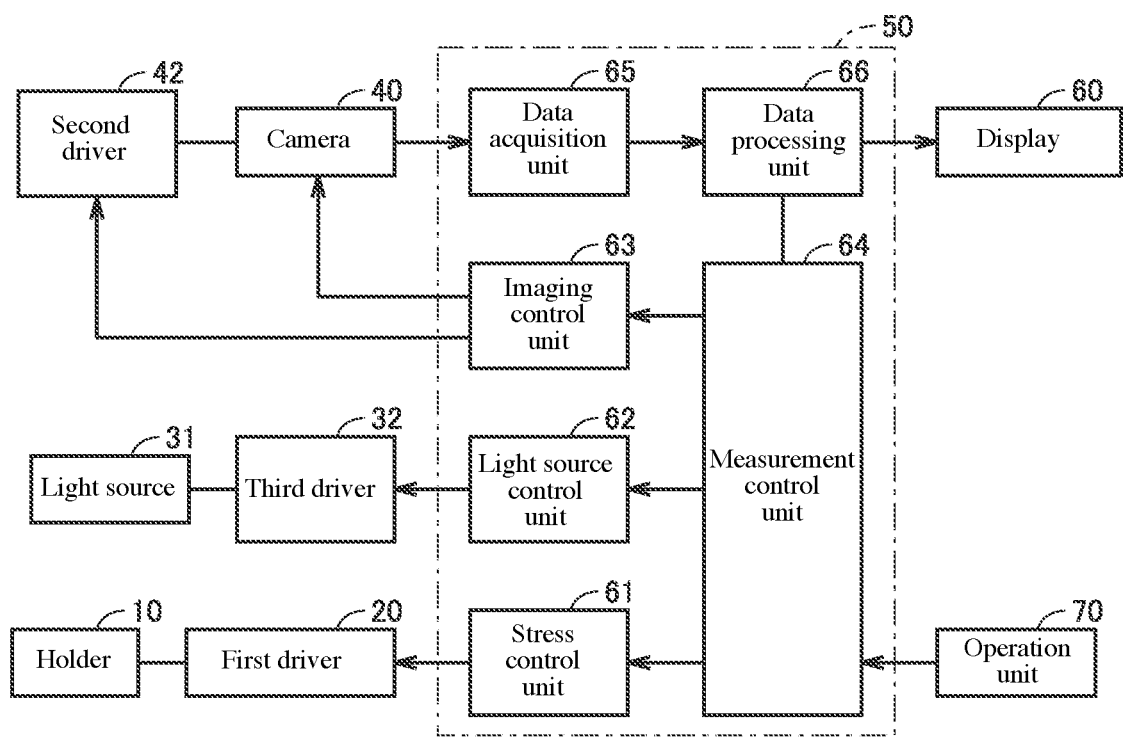
FIG. 3 is a block diagram for explaining a functional configuration of a controller.

FIG. 3 is a diagram for explaining the functional configuration of the controller 50.

Referring to FIG. 3, the controller 50 is provided with a stress control unit 61, a light source control unit 62, an imaging control unit 63, a measurement control unit 64, a data acquisition unit 65, and a data processing unit 66. These are functional blocks realized by executing the program stored in the memory 502 by the processor 501.

The stress control unit 61 controls the operation of the first driver 20. Specifically, the stress control unit 61 controls the operation speed and the operation time of the first driver 20 in accordance with a preset measurement condition. By controlling the operation speed and the operation time of the first driver 20, it is possible to adjust the rotation angle and the rotation speed of the drive shaft 13 in the holder 10. As a result, the bending angle, the folding speed, and the like, of the smartphone 1 can be adjusted.

The light source control unit 62 controls the driving of the light source 31 by the third driver 32. Specifically, the light source control unit 62 generates, based on the measurement condition set in advance, a command for instructing the magnitude of the power supplied to the light source 31 and the duration of the power supplied to the light source 31 and outputs the generated command to the third driver 32. By controlling the power supplied to the light source 31 by the third driver 32 in accordance with the command, it is possible to adjust, for example, the amount of light emitted from the light source 31 and the irradiation time of the excitation light.

The imaging control unit 63 controls the movement of the camera 40 by the second driver 42. Specifically, the imaging control unit 63 generates, based on the measurement condition set in advance and the positional information of the camera 40 input from the second driver 42, a command for moving the camera 40 following the movement of the predetermined area of the flexible display 2. The imaging control unit 63 outputs the generated command to the second driver 42. By moving the camera 40 by the second driver 42 in accordance with the command, the focusing position of the camera 40 can be maintained at at least one point of the predetermined area of the flexible display 2.

The imaging control unit 63 further controls the imaging by the camera 40. Specifically, the imaging control unit 63 controls the camera 40 to image the stress luminescent material 3 at the time of the illumination and the load application of the excitation light, according to the measurement condition set in advance. The imaging measurement condition includes a frame rate of the camera 40.

The data acquisition unit 65 acquires the image data generated by the imaging of the camera 40 and transfers the acquired image data to the data processing unit 66.

The data processing unit 66 measures the stress luminescence of the stress luminescent material 3, by performing known image processing on the image data acquired by the imaging of the camera 40 at the time of the load application. The data processing unit 66 generates, for example, an image showing the distribution of the stress luminescence intensity in the stress luminescent material 3. The data processing unit 66 can display on the display 60 the measured result including images showing the captured image by the camera 40 and the distribution of the stress luminescence intensity in the stress luminescent material 3.

The data processing unit 66 can further cause the image data obtained by the camera 40 during the excitation light exposure to be displayed on the display 60.

The measurement control unit 64 controls the stress control unit 61, the light source control unit 62, the imaging control unit 63, the data acquisition unit 65, and the data processing unit 66 in an integrated manner. Specifically, the measurement control unit 64 gives a control command to each unit, based on the measurement condition input to the operation unit 70 and the information of the smartphone 1, which becomes a sample.

<Stress Luminescence Measurement of Flexible Device>

Next, the stress luminescence measurement of the flexible display 2 using the stress luminescence measurement device 100 according to this embodiment will be described.

Figure 4:
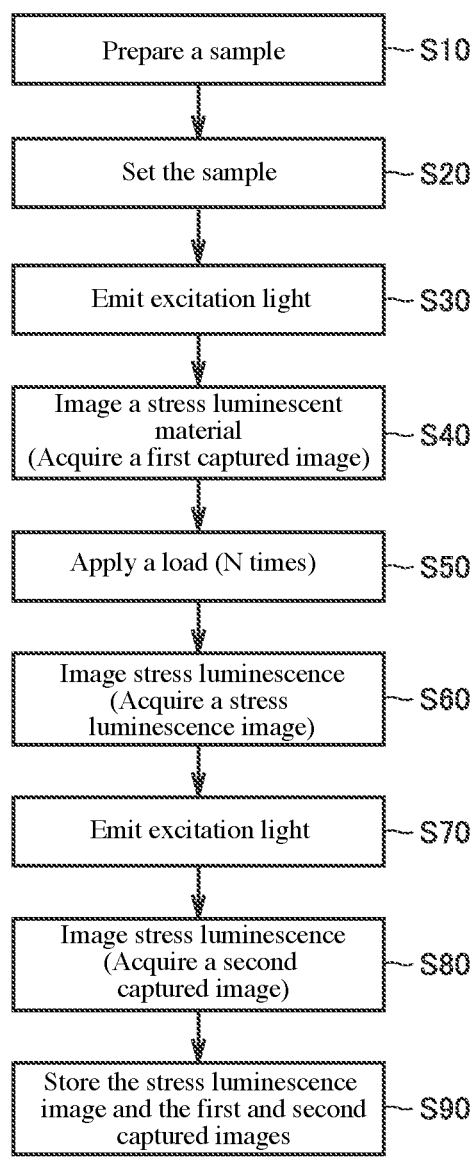
FIG. 4 is a flowchart for explaining the processing steps for a stress luminescence measurement of a flexible display using a stress luminescence measurement device.

FIG. 4 is a flowchart for explaining the processing procedures of the stress luminescence measurement of the flexible display 2 using the stress luminescence measurement device 100.

Referring to FIG. 4, first in Step S10, a smartphone 1 as a sample is prepared. In the predetermined area of the flexible display 2 of the smartphone 1, a stress luminescent material 3 is placed. For example, the stress luminescent material 3 has a rectangular shape of the same size as the size of the flexible display 2.

The stress luminescent material 3 can be formed, for example, by bonding a stress luminescent sheet having a stress luminescent material to the predetermined area of the flexible display 2. As the stress luminescent material, a material selected from the group consisting of strontium aluminate, zinc sulfide, barium titanate, silicate, and phosphate is exemplified.

In step S20, the sample is set in the holder 10 of the stress luminescence measurement device 100 (see FIG. 1). In the example of FIG. 1, to the main surface 11a of the first mounting plate 11 and the main surface 12a of the second mounting plate 12, the smartphone 1 as a sample is attached by bonding the rear surface thereof (the surface opposite to the flexible display 2) thereto.

Figure 5:
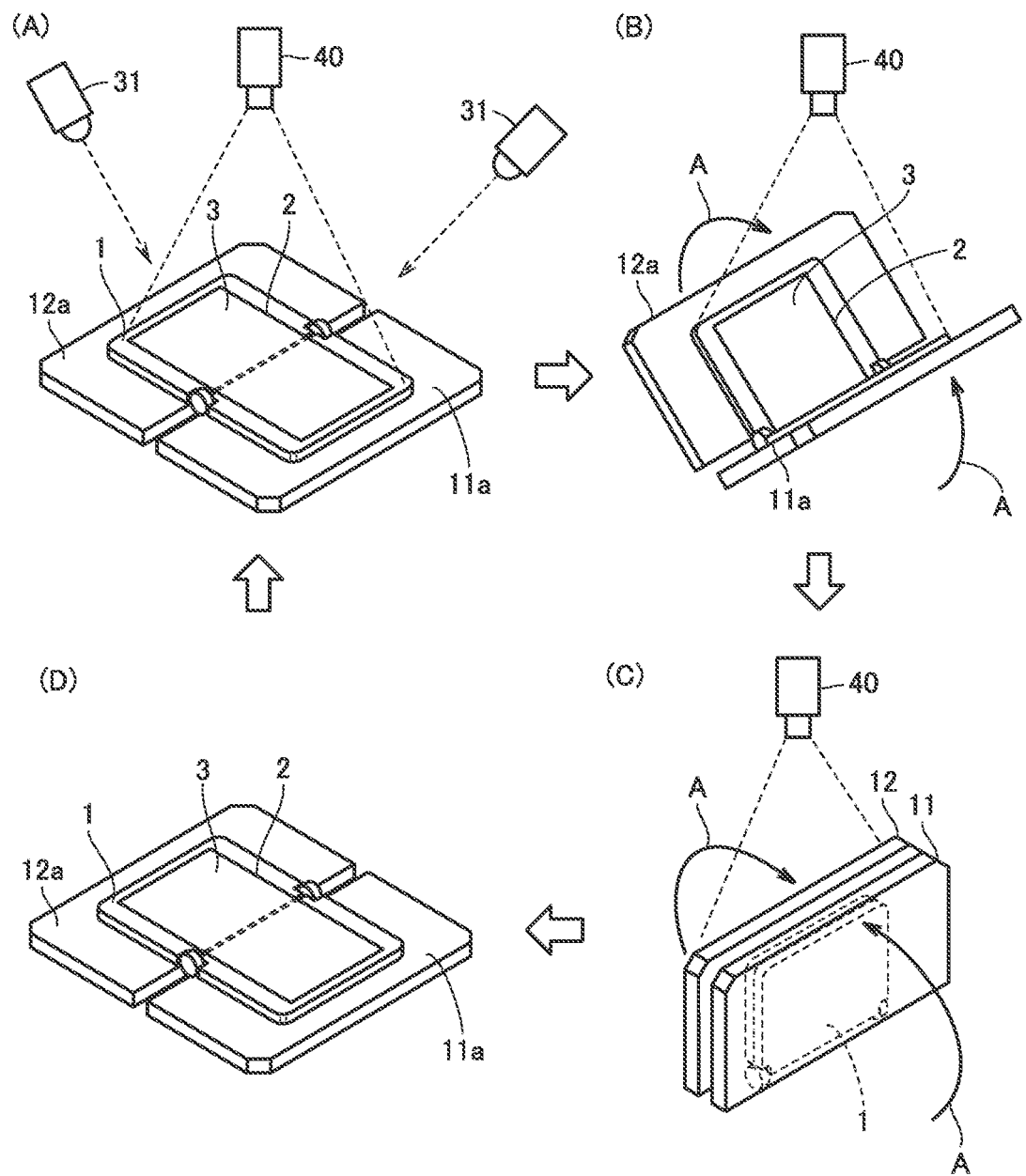
FIG. 5 is a diagram schematically showing a smartphone and a stress luminescent material as a sample.

When the sample is set in the holder 10 in Step S20, the stress luminescence measurement processing of the sample is executed by using the stress luminescence measurement device 100. With reference to FIG. 4 and FIG. 5, the procedures of the stress luminescence measurement processing according to the stress luminescence measurement device 100 will be described.

FIG. 5 is a diagram schematically showing the smartphone 1 as a sample and a stress luminescent material 3. In (A) of FIG. 5, the smartphone 1 before applying a load is shown. In (B) and (C) of FIG. 5, a smartphone 1 to which a load is being applied is shown. In (D) of FIG. 5, the smartphone 1 after applying the load is shown.

As shown in (A) of FIG. 5, the smartphone 1 is attached by bonding the back surface to the main surface 11a of the first mounting plate 11 and the main surface 12a of the second mounting plate 12 of the holder 10. A stress luminescent material 3 is arranged on the flexible display 2 of the smartphone 1.

Proceeding to Step S30 of FIG. 4, the controller 50 excites the stress luminescent material 3 (see (A) of FIG. 5) by emitting the excitation light to the stress luminescent material 3 from the light source 31. Receiving the excitation light, the luminescent material 3 transitions to the luminescence state.

Next, in Step S40 of FIG. 4, during the irradiation of the excitation light, the controller 50 images the stress luminescent material 3 by the camera 40 (see (A) of FIG. 5). By emitting the excitation light to the stress luminescent material 3 as illumination light, the stress luminescent material 3 can be identified. The camera 40 captures images of stress luminescent material 3. In this specification, among captured images of the stress luminescent material 3 by the camera 40, the captured image of the stress luminescent material 3 at the initial state (a state in which no load has been applied even once) is also referred to as a "first captured image". The controller 50 can store the acquired first captured image in the memory 502 (see FIG. 1) and display it on the display 60.

Next, in Step S50 of FIG. 4, the controller 50 applies a load (bending load) to the flexible display 2 by driving the first driver 20 to fold the smartphone 1. As shown in (B) of FIG. 5, the smartphone 1 is folded by rotating the drive shaft 13 in the forward direction by the first driver 20. In (B) and (C) of FIG. 5, a state in which the smartphone 1 is folded in a stepwise manner in conjunction with the forward rotation of the drive shaft 13 is shown. (D) of FIG. 5 shows a state in which the smartphone 1 is extended.

In Step S60 of FIG. 4, the controller 50 images the stress luminescent material 3 by the camera 40 in accordance with the timing of the load application to the flexible display 2, That is, the camera 40 images the light emission of the stress luminescent material 3. The imaging by the camera 40 is performed in a dark room. In this specification, the captured image of the stress luminescence by the camera 40 is also referred to as a "stress luminescence image". The controller 50 may cause the display 60 to display the acquired stress luminescence image and the measurement results including the image showing the stress luminescence intensity distribution at the stress luminescent material 3.

Here, when the smartphone 1 supported by the holder 10 is folded, the bending central portion of the flexible display 2 is moved in the Z-axis direction and in the Y-axis direction in FIG. 2. Specifically, the bending central portion of the flexible display 2 is translated in the Y-axis direction and moves in a direction away from the camera 40 along the Z-axis direction. On the other hand, when the smartphone 1 is extended, the bending central portion is translated in the Y-direction and moves in a direction of approaching the camera 40 along the Z-axis direction. Therefore, in a case where the position of the camera 40 is fixed, the relative position between the camera 40 and the predetermined area varies according to the movement of the predetermined area of the flexible display 2. Consequently, the distance between the camera 40 and the at least one point of the predetermined area will also vary. Since the focus position of the camera 40 at this time is fixed, if the distance between the camera 40 and the at least one point varies, the camera 40 cannot focus on the above-described at least one point, and as a result, it may be difficult to obtain images focused on the at least one point.

Therefore, the controller 50 is configured to control at least one of the first driver 20 and the second driver 42 so as to maintain the focal position of the camera 40 at at least one point of the predetermined area of the flexible display 2 at the time of imaging by the camera 40.

As one aspect of such a control, in this embodiment, the controller 50 controls the second driver 42 so as to maintain the focusing position of the camera 40 at at least one point of the predetermined area of the flexible display 2. Specifically, the second driver 42 is configured to maintain the focusing position of the camera 40 at at least one point in the predetermined area by moving the camera 40 in response to the moving of the predetermined area in accordance with a command received from the controller 50.

Figure 6:
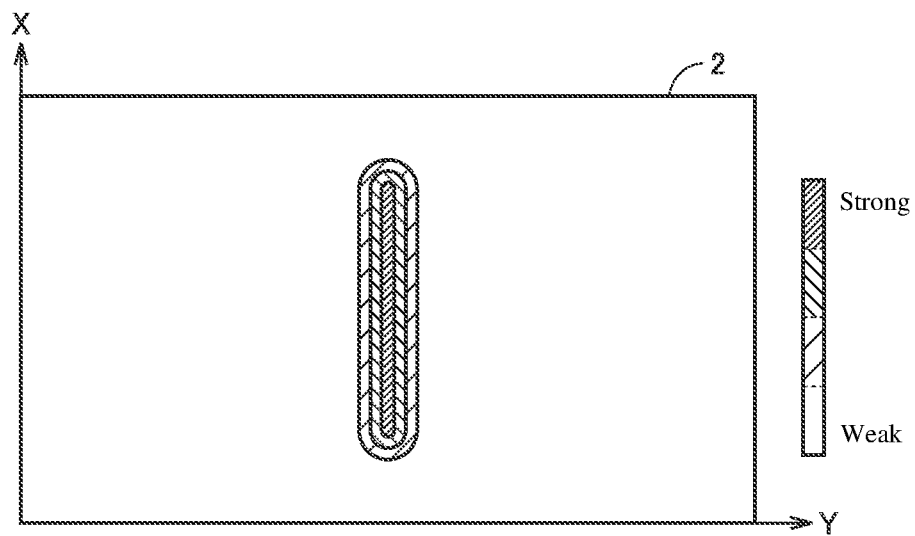
FIG. 6 is a diagram schematically illustrating a stress luminescence image acquired in Step S60 of FIG. 4.

FIG. 6 is a diagram schematically illustrating the stress luminescence image acquired in Step S60 of FIG. 4. As shown in FIG. 6, in the stress luminescence image, the degree of the stress luminescence intensity is expressed in brightness on a two-dimensional plane. Note that in the stress luminescence image, the strength and weakness of the stress luminescence intensity may be represented by at least one of chromaticity, saturation, and lightness. In FIG. 6, the strength and weakness of the stress luminescence intensity is depicted with different hatchings for convenience. Therefore, on the right side of the captured image, a bar indicating the extent of the hatching assigned according to the strength and weakness of the stress luminescence intensity is shown.

As shown in FIG. 6, in the stress luminescence image, the stress luminescence pattern appears as a strip-shape extending vertically (in the X-axis direction) at the central portion (i.e., the bending center portion) in the lateral direction (Y-axis direction) of the stress luminescent material 3. This stress luminescence pattern corresponds to the deformation area of the flexible display 2. Thus, by extracting the stress luminescence pattern from the captured image and analyzing it, the distortion occurred in the flexible display 2 can be visualized and quantified. Specifically, the portion of the stress luminescence pattern where the stress luminescence intensity is large indicates the part where strain is large, and the part where the stress luminescence intensity is small indicates the part where strain is small. Therefore, based on the distribution of the stress luminescence intensity, it is possible to visualize and quantify the distribution of the amount of strain of the flexible display 2 in the folded state.

Further, by repeatedly performing the folding of the smartphone 1 ((B) and (C) of FIG. 5) and the stretching of the smartphone 1 ((D) of FIG. 5) as described above at a fixed cycle (the operation cycle of the first driver 20), the bending load can be repeatedly applied to the flexible display 2. Then, by imaging the stress luminescence of the stress luminescent material 3 during the repeated operation of the bending and stretching by the camera 40, it is possible to evaluate the durability against the repeated load applied to the flexible display 2.

For example, the user can observe the temporal changes in the stress luminescence intensity during the folding test of the sample. The user can set at least one region of interest (ROI: Region of Interest) within the stress luminescence image using the operation unit 70. Upon acquiring the image data by the imaging by the camera 40, the controller 50 (the data processing unit 66 in FIG. 3) calculates the value based on the stress luminescence intensity within the ROI. The value based on the stress luminescence intensity in the ROI can be calculated by statistical processing or common arithmetic processing of the stress luminescence intensity within the ROI. In this specification, the controller 50 calculates the average emission intensity within the ROI for each frame and displays the graph indicating the relation between the calculated average emission intensity and the bending angle of the smartphone 1 on the display 60. This allows the user to observe in real time how the stress luminescence intensity of the ROI changes depending on the sample bending angle by referring to the graph displayed on the display 60 during the execution of the single folding test.

Figure 7:
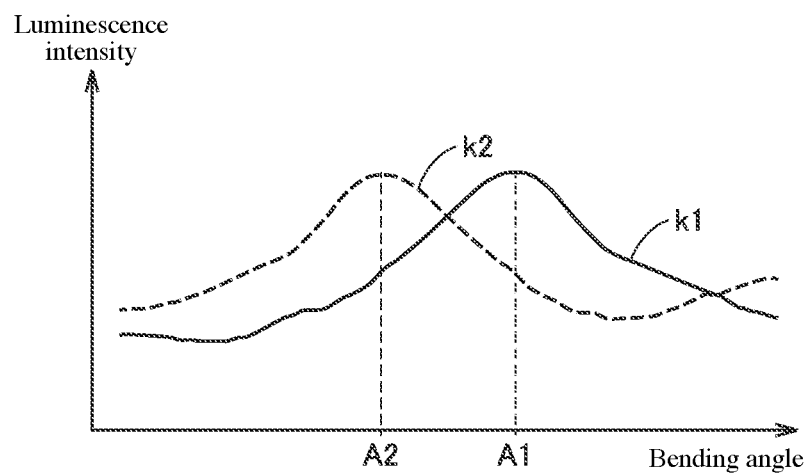
FIG. 7 is a diagram illustrating an exemplary graph illustrating the relation between the stress luminescence intensity and the bending angle in the region of interest (ROI).

In a case where the folding test of the sample is repeatedly performed, the stress luminescence intensity within the ROI can be compared among a plurality of folding tests. FIG. 7 is a diagram illustrating an example showing the relation between the stress luminescence intensity and the bending angle within the ROI. The vertical axis in FIG. 7 represents the stress luminescence intensity, and the horizontal axis represents the bending angle of the sample. The waveform k1 in the figure is a graph showing the relation between the bending angle and the stress luminescence intensity when no defect is generated in the flexible display 2. The stress luminescence intensity depends on the amount of strain of the stress luminescent material 3. That is, at the bending angle A1 where the amount of strain becomes the largest, the stress luminescence intensity is maximized.

On the other hand, the waveform k2 in the figure is a graph showing the relation between the bending angle and the stress luminescence intensity when a defect, such as, e.g., fine cracking and chipping, occurred in the flexible display 2 due to the repetition load. When a defect occurs in the flexible display 2, the stress luminescence intensity of the defect part becomes stronger than the periphery due to the concentration of the stress in this defect portion. This results in the change of the distribution of the stress luminescence intensity.

In the waveform k2, due to the occurrence of the defect in the flexible display 2, as compared with the waveform k1, the bending angle at which the stress luminescence intensity is the largest value has been changed. Note that this change in the bending angle depends on the position of the defect generated in the flexible display 2.

For each folding test, the controller 50 detects the maximum value of the stress luminescence intensity and the bending angle of the smartphone 1 at that time, based on the graph showing the relation between the stress luminescence intensity and the bending angle within the ROI, and records the detected value in the memory 502

Note that the amount of light emission of the stress luminescent material is gradually decreased when load is repeatedly applied to the stress luminescent material 3. Therefore, when the folding test of the smartphone 1 is performed N times (N is an integer equal to or greater than 1), the controller 50 proceeds to Step S70 of FIG. 4, and re-excites the stress luminescent material 3 by irradiating the stress luminescent material 3 with the excitation light (see (A) of FIG. 5). Then, the controller 50 proceeds to Step S80 in FIG. 4 and images the stress luminescent material 3 during the excitation light illumination by the camera 40 ((A) of FIG. 5). That is, the controller 50 images the stress luminescent material 3 after the excitation light has been removed by utilizing the excitation light as illumination light, when re-exciting the stress luminescent material 3 after the load application. In this application specification, among the captured images of the stress luminescent material 3 by the camera 40, the captured image of the stress luminescent material 3 in a state in which the load has been removed is also referred to as a "second captured image".

The controller 50 may cause the display 60 to display the acquired second captured image.

This second captured image is a captured image of the stress luminescent material 3 in a state in which no load is not applied. Therefore, originally, it becomes the same as the first captured image acquired in Step S40. Note that the first captured image is a captured image of the stress luminescent material 3 in a default state.

In the second captured image, however, changes from the first captured image may occur. This change in the second captured image with respect to the first captured image is a change in the appearance of the stress luminescent material 3, and represents the local defect caused by the load application, such as, e.g., fine cracking and chipping occurred in the flexible display 2. Therefore, by comparing the first captured image and the second captured image to grasp the change in the appearance of the stress luminescent material 3, the occurrence of a local defect in the sample can be detected.

In Step S90 of FIG. 4, the controller 50 stores the second captured image acquired in Step S80 in the memory 502 (see FIG. 1) as image data of the sample, in association with the first captured image acquired in Step S40 and the stress luminescence image acquired in Step S60. Using the image data (the stress luminescence image, the first and second captured images) stored in the memory 502, a defect that occurred in the sample can be detected.

As described above, according to the stress luminescence image, it is possible to visualize the temporal change in the stress luminescence intensity. Therefore, it is possible to grasp the change in the stress luminescence intensity distribution due to the local defect of the sample and the change in the bending angle when the stress luminescence intensity becomes the maximum value. This enables the detection of which timing during the folding operation defect has occurred in the sample. However, since the light emission of the stress luminescent material 3 is imaged in a light-shielded state, it is difficult to accurately grasp the portion where the defect occurred.

On the other hand, since the second captured image is an image obtained by imaging the stress luminescent material 3 by using the excitation light as illumination light, it is possible to visualize the change in the appearance from the first captured image appearance based on the defect of the sample. Therefore, the position where the defect of the sample has occurred can be accurately grasped based on the change in the external appearance. Therefore, by storing the stress luminescence image in conjunction with the first and second captured images, these images can be used to detect the position of the defect in addition to the timing where the defect occurs in the sample.

<Specific Embodiments of Stress Luminescence Measurement Processing>

Hereinafter, in order to describe the stress luminescence measurement processing in the stress luminescence measurement device 100 according to this embodiment in more detail, a specific embodiment will be described.

The stress luminescence measurement processing according to this embodiment may include, for example, the following embodiments. It should be noted that, however, the stress luminescence measurement processing according to this embodiment is not limited to the following embodiments as long as the effect of the present invention can be obtained.

Figure 8:
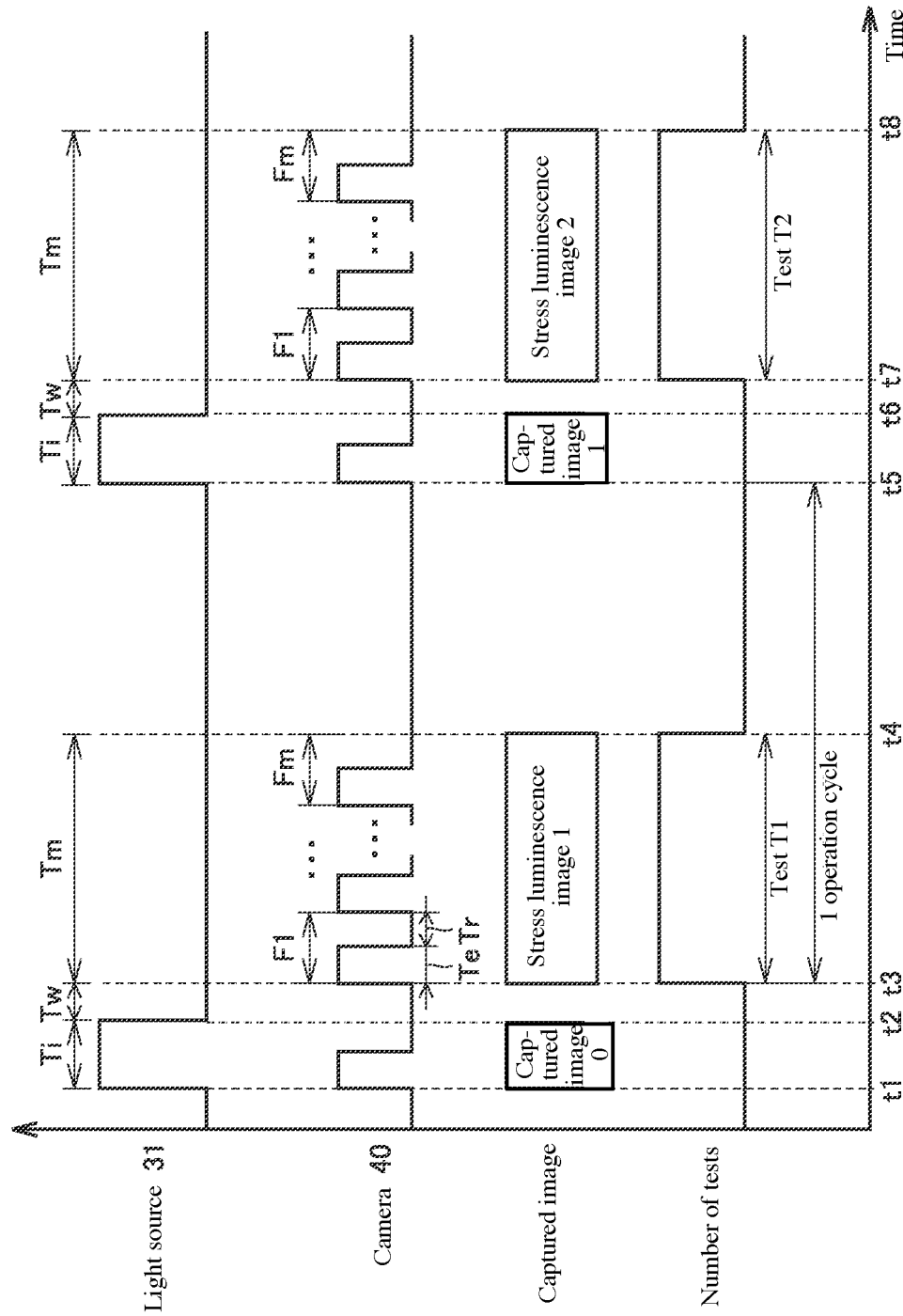
FIG. 8 is a timing chart for explaining the operation of a light source, a camera and a holder in a stress luminescence measurement processing according to an embodiment.

FIG. 8 is a timing chart for illustrating the operation of the light source 31, the camera 40, and the holder 10 in the stress luminescence measurement processing according to an embodiment. In FIG. 8, a waveform showing the irradiation timing of the excitation light in the light source 31, a waveform showing the imaging timing of the camera 40, and a waveform showing the operation timing of the holder 10 by the first driver 20 are shown.

The operation timing of the holder 10 is represented by the "number of tests". The operation of folding the sample (smartphone 1) by the holder 10 is referred to as one folding test (hereinafter also referred to simply as a "test"). Therefore, one test is performed in the first half of one operation cycle of the first driver 20. After a single test, the sample is returned from the folded state to the flat state by stretching the sample with the holder 10. In the example of FIG. 8, the test is repeatedly performed a plurality of times. In FIG. 8, the first test is denoted as "T1" and the second test is denoted as "T2".

The stress luminescence measurement device 100 measures the luminescence of the stress luminescent material 3 during a plurality of tests. In one stress luminescence measurement processing, the controller 50 performs a step of emitting the excitation light from the light source 31 to the stress luminescent material 3 (S30 in FIG. 5), a step of imaging the stress luminescent material 3 during the excitation light illumination by the camera 40 (S40 in FIG. 5), a step of applying a load to the sample (S50 in FIG. 5), and a step of imaging the luminescence of the stress luminescent material 3 by the camera 40 (S60 in FIG. 5).

In FIG. 8, the test T1 is started at the time t3. During the time T1 from the time t1 before the time t3 to the time t2, the excitation light is emitted from the light source 31 to the stress luminescent material. The time Ti from the time t1 to the time t2 corresponds to the irradiation time of the light source 31. The time Tw from the time t2 to the time t3 corresponds to the waiting time from the end of the irradiation of the excitation light until the start of the measurement. In the irradiation time T1, the stress luminescent material 3 is imaged initially by the camera 40. In the example of FIG. 8, the captured image (the first captured image) in the initial state is referred to as a "captured image 0". The controller 50 displays the acquired data of the captured image 0 on the display 60 (see FIG. 1) and stores it in the memory 502 (see FIG. 1).

When the test T1 is started at the time t3, the imaging of the stress luminescence by the camera 40 is started. During the measurement time Tm, the imaging by the camera 40 is continuously performed until the time t4 at which the test T1 ends at the time t4. That is, the time Tm from the time t3 to the time t4 corresponds to the measurement time of the stress luminescence.

During the measurement time Tm, the number of still images corresponding to the frame rate of the camera 40 is generated. The frame rate is the number of frames (still images) processed per unit time in the moving image processing. Assuming that the exposure time of the camera 40 is Te and the interval time from after the exposure to the exposure of the next frame is Ti, the number m of frames can be expressed by m=Tm/(Te+Tr). In the example of FIG. 8, the stress luminescence image acquired in the kth test Tk is referred to as a "stress luminescence image k". The controller 50 displays the data of the generated stress luminescence image k on the display 60 and stores it in the memory 502.

The controller 50 generates a graph (see FIG. 7) showing the relation between the luminescence intensity and the sample in the ROI and the bending angle of the sample, based on the stress luminescence image which is sequentially stored in the memory 502. The controller 50 also detects the highest value of the stress luminescence intensity and the bending angle at that time and records the detected value in the memory 502.

During the time Ti (irradiation time) from the time t5 before the time t7 test T2 to the time t6, the excitation light is emitted from the light source 31 to the stress luminescent material 3, and the stress luminescent material 3 is imaged by the camera 40. In the example of FIG. 8, the captured image (second captured image) after the removal of the load at the kth test Tk is referred to as a "captured image k". The controller 50 displays the acquired data of the captured image k on the display 60 and stores it in the memory 502 in association with the data of the captured image 0 and the stress luminescence image k.

Note that in FIG. 8, a configuration is shown in which the excitation light emitted to the stress luminescent material 3 every one test is performed, but it may be configured to emit the excitation light to the stress luminescent material 3 every time the test is performed a plurality of times.

According to this embodiment, the stress luminescent material 3 is imaged by utilizing the excitation light for exciting the stress luminescent material 3 as illumination light, and therefore the installation of an illumination light source for capturing the first and second captured images is not required. Therefore, it is possible to prevent an increase in the number of components of the stress luminescence measurement device 100.

Further, according to this embodiment, the stress luminescent material 3 can be imaged using the time for exciting the stress luminescent material 3. Therefore, it is possible to prevent an increase in the time required for the stress luminescence measurement processing for acquiring the first and second captured images.

Figure 9:
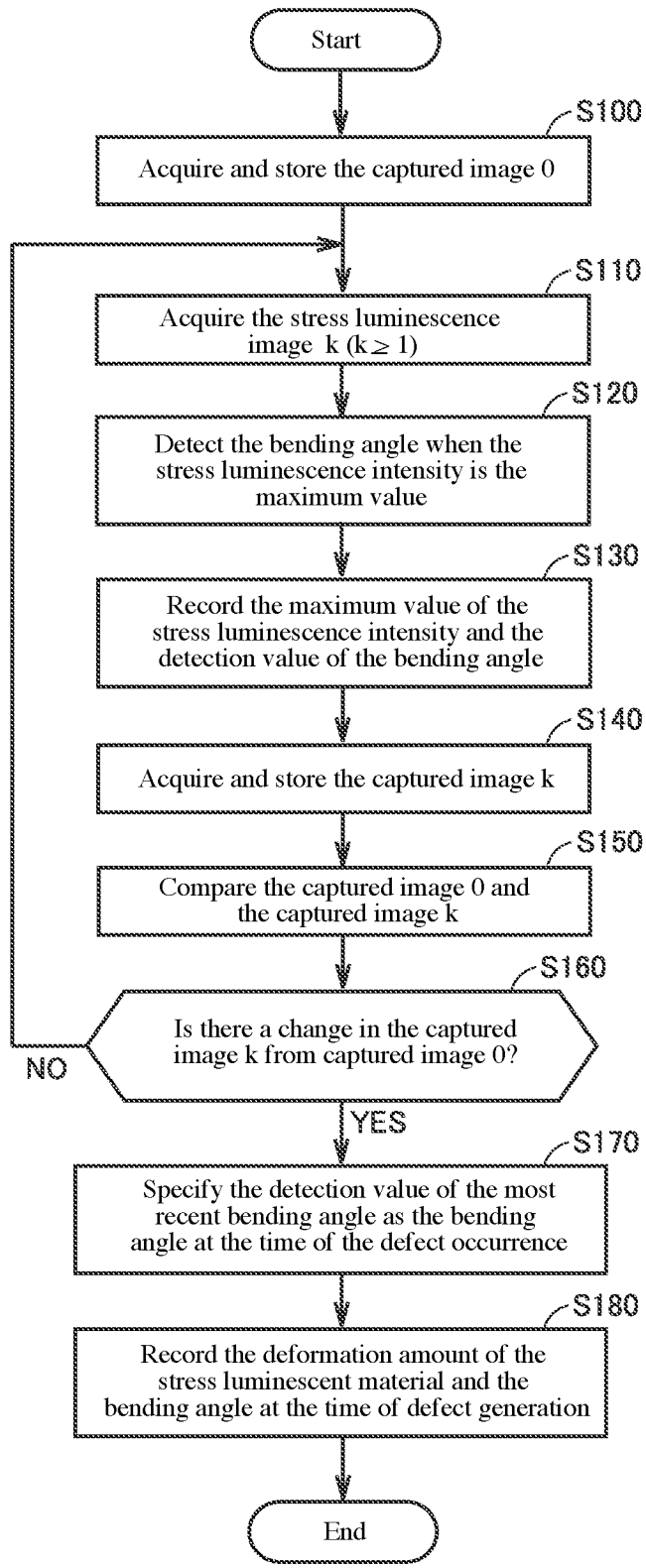
FIG. 9 is a flowchart for explaining the determination processing executed by a controller.

The controller 50 determines at which timing during the folding operation the defect occurred and at which portion of the flexible display 2 the defect occurred, based on the captured image 1, the stress luminescence image k, and the captured image k stored in the memory 502 during the stress luminescence measurement processing. FIG. 9 is a flowchart for explaining the determination processing executed by the controller 50 in the stress luminescence measurement process according to this embodiment Referring to FIG. 9, the controller 50 stores the data of the captured image 0 in the memory 502 in Step S100. Next, when the controller 50 acquires the stress luminescence image k in Step S110 during the execution of the test Tk, the controller 50 generates a graph (see FIG. 7) showing the relation between the stress luminescence intensity within the ROI and the bending angle of the sample in one test and displays the generated graph on the display 60. The controller 50 detects, in Step S130, the maximum value of the stress luminescence intensity and the bending angle when the stress luminescence intensity becomes the maximum value from graph and stores the detected value in the memory 502.

Next, when acquiring the captured image k in Step S140, the controller 50 stores the data of the captured image k in the memory 502 in association with the data of the captured image 0 and the stress luminescence image k.

The controller 50 determines, in Step S150, whether or not a change from the captured image 0 occurred in the captured image k, i.e., the change (defect) in appearance from the initial state occurred in the stress luminescent material 3, by comparing the captured image 0 and the captured image k. In Step S150, the controller 50 detects the amount of deformation of the captured image k relative to the captured image 0 by using known image processing technique. When the detected deformation amount exceeds a predetermined tolerance, the controller 50 determines that the appearance of the stress luminescent material 3 has changed.

When it is determined that the change in the captured image k has occurred (YES in S160), the processing proceeds to Step S170, and the controller 50 specifies the detected value of the bending angle obtained in the most recent test Tk−1, the bending angle when the change in the appearance of stress luminescent material 3 occurs to identify.

In Step S180, the controller 50 stores the deformation amount of the stress luminescent material 3 detected in Step S150 and the bending angle identified in Step S170 in the memory 502 in an associated manner.

<Other Configuration Examples of Stress Luminescent Material>

In the above-described embodiment, a configuration is exemplified in which a stress luminescent sheet as the stress luminescent material 3 is bonded to the predetermined area of the surface of the flexible display 2. But, when the film thickness of the stress luminescent sheet is increased, minute strain becomes less likely to appear in the stress luminescent sheet. For this reason, there is a concern that it becomes difficult to capture the change in the appearance of the stress luminescent material 3 in the captured image of the stress luminescent material 3.

Hereinafter, as another configuration example of the stress luminescent material 3, a configuration will be described in which a marker containing a stress luminescent material is arranged in the predetermined area of the surface of the flexible display 2.

Figure 10:
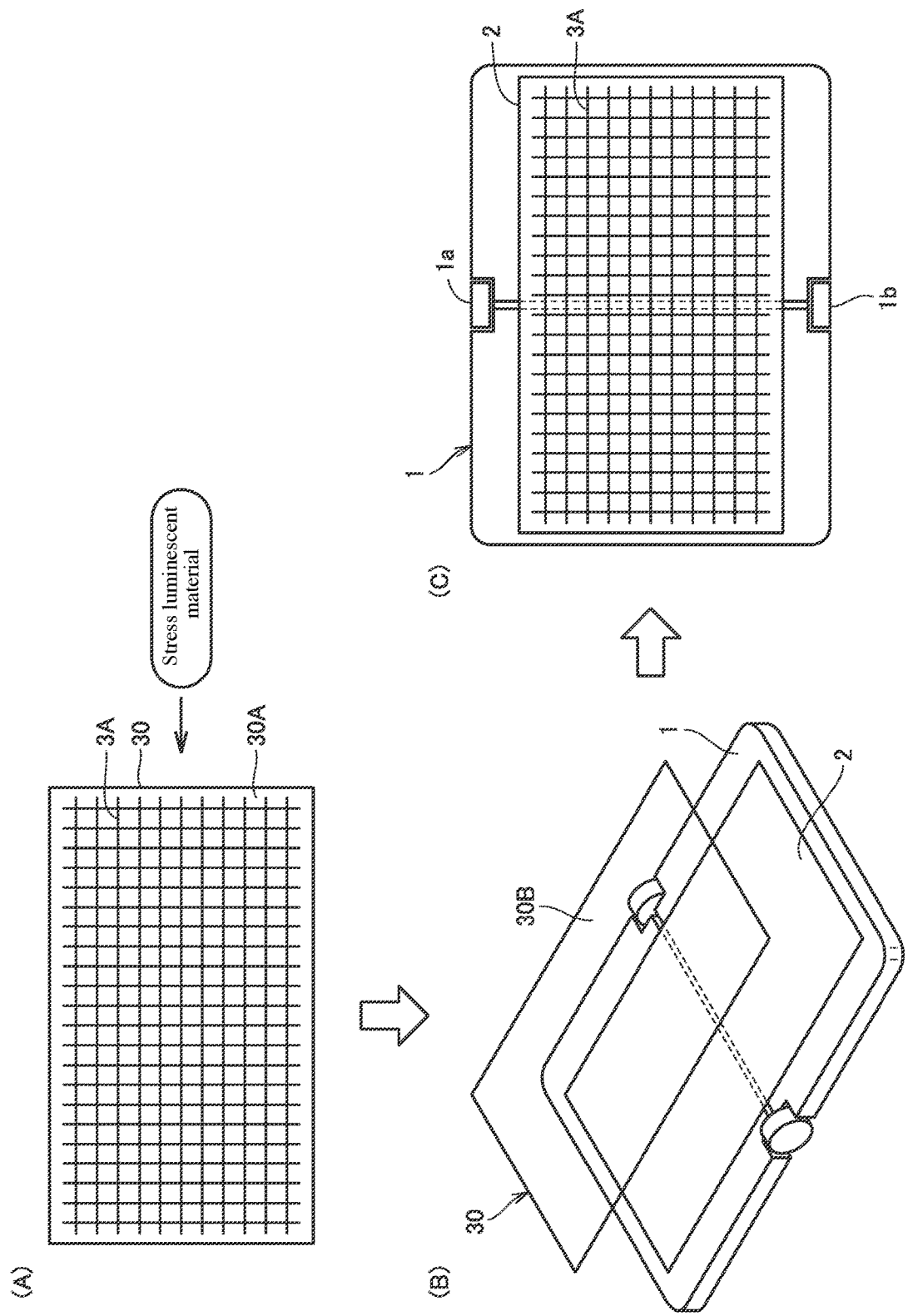
FIG. 10 is a diagram for explaining the sample preparation processing in Step S10 of FIG. 4.

FIG. 10 is a diagram for explaining the sample preparation processing in Step S10 of FIG. 4. FIG. 10 schematically shows a plan view of a smartphone 1 and a transfer sheet 30 serving as a sample. As shown in (C) of FIG. 10, the smartphone 1 is configured to be foldable with a pair of hinge portions 1a and 1b provided at both ends of the center line in the widthwise direction of the flexible display 2 as fulcrums.

In the sample preparation processing, as shown in (A) of FIG. 10, a transfer sheet 30 in which a marker 3A containing a stress luminescent material is formed is prepared. In the case of (A) of FIG. 10, the transfer sheet 30 has a rectangular shape having approximately the same size as the size of the flexible display 2. The transfer sheet 30 has a first surface 30A, which is one surface, and a second surface 30B, which is the other surface.

A marker 3A is formed on the first surface 30A of the transfer sheet 30 using ink or paint. Conventional print techniques can be used to form the marker 3A on the transfer sheet 30. The ink or paint used to form the marker 3A contains a predetermined percentage of the stress luminescent material.

Next, the marker 3A is transferred onto the flexible display 2 of the smartphone 1. More specifically, as shown in (B) of FIG. 10, the first surface 30A of the transfer sheet 30 is brought into contact with and pressed against the surface of the flexible display 2 of the smartphone 1 serving as a sample. Thereafter, by separating the flexible display 2 and the transfer sheet 30, as shown in (C) of FIG. 10, the marker 3A on the first surface 30A of the transfer sheet 30 is transferred onto the surface of the flexible display 2.

It should be noted that the method of forming the marker 3A on the surface of the flexible display 2 is not limited to the transfer printing using the transfer sheet 30 described above. For example, it is possible to adopt a method of printing a marker 3A using ink containing a stress luminescent material directly on the surface of the flexible display 2.

In the central portion of the flexible display 2 in the lateral direction (the left-right direction of (C) of FIG. 10), a deformation area is formed during the folding operation of the smartphone 1. This deformation area has a strip-shape extending in the longitudinal direction (the up-down in (C) of FIG. 10). The marker 3A is adhered to the flexible display 2 so as to be positioned at least on the deformation area. In the embodiment shown in (C) of FIG. 10, the marker 3A is arranged so as to cover the entire area of the flexible display 2.

The marker 3A has a pattern and can serve as an indicator for locating the flexible display 2. In the example of FIG. 10, the marker 3A has a plaid pattern. In the predetermined area of the flexible display 2, a plurality of intersections formed by vertical and horizontal stripes constituting the plaid pattern is arranged in a matrix. From the position of the individual intersections, the position on the surface of the flexible display 2 can be determined.

Once the marker 3A is transferred to the sample, the stress luminescence measurement processing (Steps S20 to S90 in FIG. 4) of the sample is performed using the stress luminescence measurement device 100 (see FIG. 1). In this configuration example, in Step S40, S80 of FIG. 4, utilizing the excitation light as illumination light, the marker 3A is imaged by the camera 40.

Figure 11:
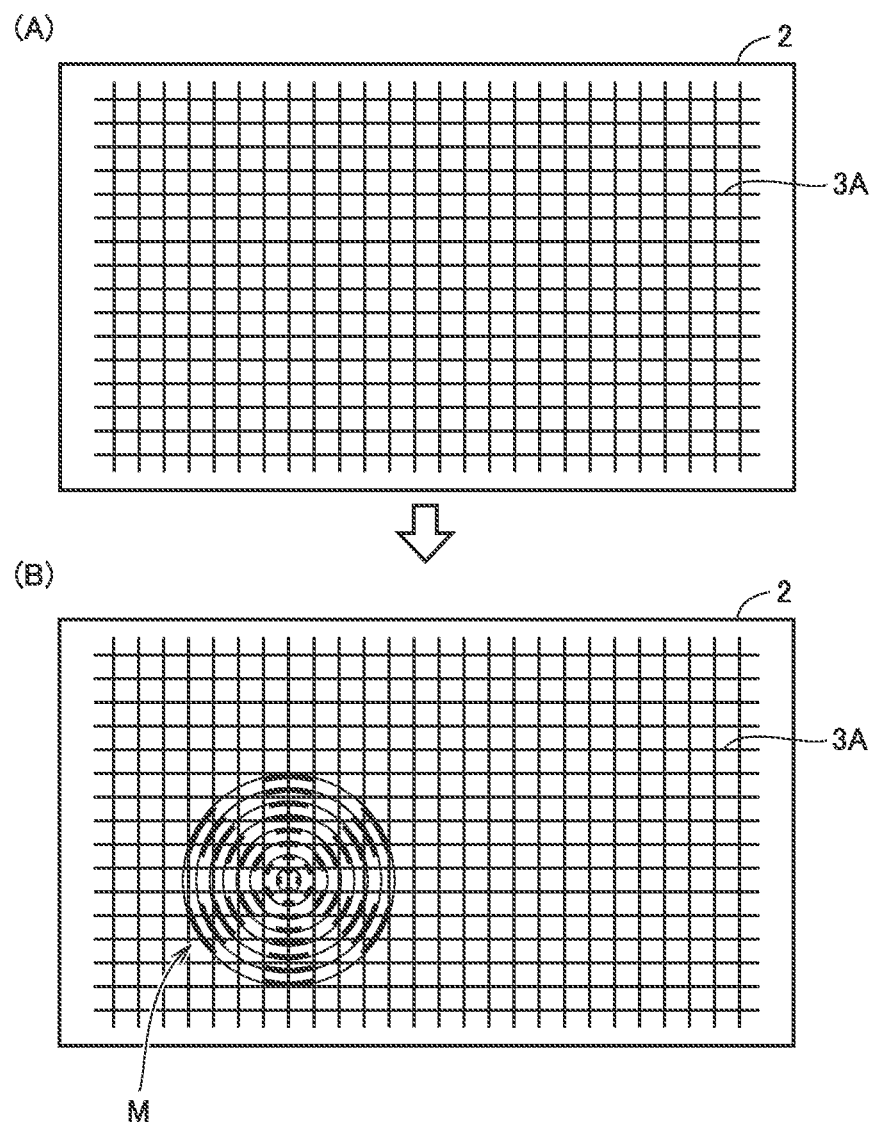
FIG. 11 is a diagram schematically illustrating an example of the first and second captured images by a camera.

FIG. 11 is a diagram schematically showing an example of the first and second captured images according to the camera 40. (A) of FIG. 11 shows a first captured image schematically, and (B) of FIG. 11 shows a second captured image schematically.

As shown in (A) of FIG. 11, a pattern of the plaid pattern that the marker 3A has appears on the first captured image. The same pattern appears in the second captured image.

However, in a case where a defect, such as, e.g., a fine crack and chipping, occurs in the sample, a change appears in this pattern in the second captured image. In the example of (B) of FIG. 11, there is a Moire (interference fringe) M in a portion of the luminescence pattern of the plaid pattern. In the portion where this Moire M is occurring, a deformation (distortion) is occurring in the pattern. It can be determined that a defect is occurring in the flexible display 2 in the portion corresponding to this distortion of this pattern.

Specifically, as is apparent from the comparison of (A) of FIG. 11 and (B) of FIG. 11, due to the defect generated in the flexible display 2 by the repeated loads, a deformation (strain) appears in the pattern of the marker 3A. The portion where the pattern of the marker 3A is deformed corresponds to the portion where the defect of the flexible display 2 is occurring. Therefore, by comparing the first captured image and the second captured image to extract the pattern distortion of the marker 3A, it is possible to identify at which part of the flexible display 2 the defect is occurring.

That is, in this configuration example, the marker 3A serves as an index for measuring the temporal change of the stress generated in the flexible display 2 during the folding operation of the smartphone 1, and may also serve as an index for identifying the position where the defect occurs in the flexible display 2. In this modification, since the marker 3A is set to a plaid pattern, a Moire depending on the generation portion of the abnormal distortion appears in the luminescence pattern of the marker 3A. Therefore, it is possible to easily and accurately specify the generation portion of the defect.

Figure 12:
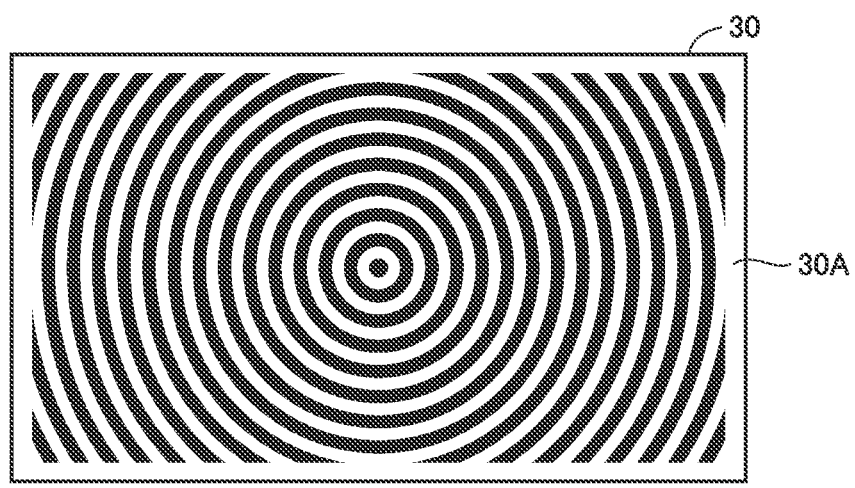
FIG. 12 is a diagram schematically showing another configuration example of a marker.
Figure 13:
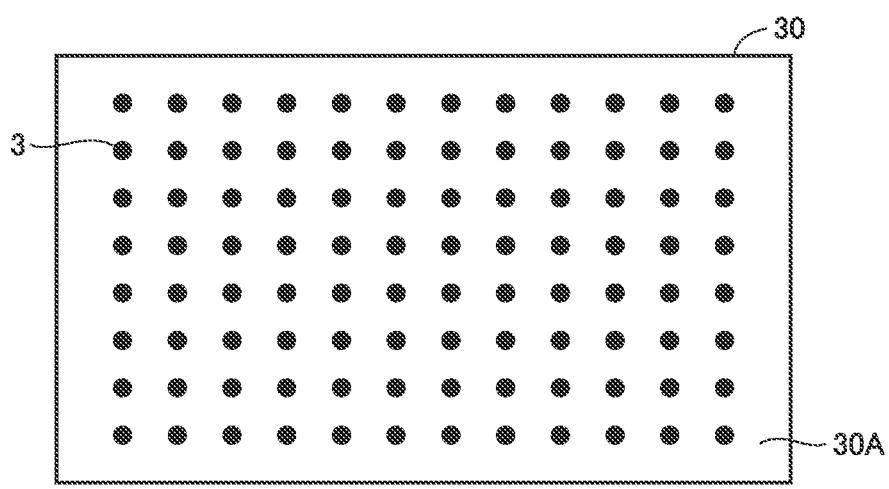
FIG. 13 is a diagram schematically showing another configuration example of a marker.

It should be noted that the pattern of the marker 3A may have any configuration as long as the pattern is deformed depending on the generation position of a defect of a sample. For example, as shown in FIG. 12, the marker 3A may be configured to have a pattern consisting of a plurality of circles arranged concentrically about the bending center of the flexible display 2. Alternatively, as shown in FIG. 13, the marker 3A may be configured to have a pattern comprising a plurality of dots arranged in a matrix on the front surface of the flexible display 2.

As described above, in the configuration of placing the stress luminescent sheet on the predetermined area of the surface of the flexible display 2, depending on the film thickness of the stress luminescent sheet, there is a concern that minute strain is hardly appeared in the stress luminescent sheet. On the other hand, in this configuration example, on the surface of the flexible display 2, by forming the marker 3A having a pattern, a small strain tends to appear in the pattern. Consequently, the generation of a defect in the flexible display 2 can be detected at an earlier stage. In addition, since the portion in which the pattern is deformed is closely associated with the portion in which a defect is generated, it is possible to easily specify at which portion of the flexible display 2 the defect starts to occur.

Note that even in this configuration example, in a case where it is determined that a defect is occurring in the flexible display 2 from the second captured image after the load removal, by referring to the stored content of the memory 502, it is possible to obtain the detected value of the bending angle when the stress luminescence intensity becomes the maximum value in the folding test performed immediately after the irradiating of excitation light. According to this, it is possible to specify the bending angle when the defect occurred in the flexible display 2. For example, in a case where such as the waveform k2 in FIG. 7 in the most recent folding test has been acquired, it can be determined that the defect occurred when the bending angle A2 when the stress luminescence intensity obtained from the waveform k2 becomes the largest value.

MORE CONFIGURATION EXAMPLES

In the embodiments described above, as a flexible device mounted product, a foldable smartphone provided with a flexible display is exemplified, but the flexible device mounted product includes a wrapped or wound type flexible device. When performing a deformation test of such products, the load application mechanism can be configured to reproduce the load applied to the flexible device at the time of the winding or unwinding operation.

ASPECTS

It will be understood by those skilled in the art that the plurality of exemplary embodiments described above is illustrative of the following aspects.
(Item 1)
A stress luminescence measurement method according to the first aspect of the present invention, include the steps of: placing a stress luminescent material on a surface of a sample; irradiating the stress luminescent material with excitation light; acquiring a first captured image by imaging the stress luminescent material during irradiation of the excitation light; applying a load to the sample; acquiring a stress luminescence image by imaging stress luminescence of the stress luminescent material; irradiating the stress luminescent material after removal of the load with the excitation light; acquiring a second captured image during irradiation of the excitation light by imaging the stress luminescent material in a state in which the load has been removed; and storing the first captured image and the second captured image in a memory in association with the stress luminescent image.

According to the stress luminescence measurement method described in the first Item 1, an external change (deformation) resulting from a defect of a sample occurred at the time of the load application appears on the load stress luminescent material after the load removal. Therefore, by imaging the stress luminescent material after the load removal, it is possible to grasp the portion where the appearance is deformed with respect to the initial state of the stress luminescent material (a state in which no load has been applied even once). Based on the change in the appearance, it is possible to detect the occurrence of a defect and the portion at which the defect occurred in the ample. Furthermore, based on the temporal change in the stress luminescence during the load application, which is observed from the stress luminescence image associated with the first and second captured images, it is possible to detect at which timing the defect occurred in the sample.

In addition, by imaging the stress luminescent material using excitation light as illumination light, installation of an illumination light source for acquiring the first and second captured images is not required. Therefore, the above-described stress luminescence measurement method can be realized without increasing the number of components of the stress luminescence measurement device.

Furthermore, since the stress luminescent material can be imaged utilizing the time to excite the stress luminescent material, it is possible to prevent the time required for the stress luminescence measurement to acquire the first and second captured images from increasing.
(Item 2)
In the stress luminescence measurement method as recited in the above-described Item 1, the stress luminescent material is a marker having a pattern capable of specifying a position on a surface of the sample According to the stress luminescence measurement method as recited in the Item 2, the marker can be an index for identifying the timing at which the defect of the sample occurred and an index for identifying the position of the defect in the sample. This makes it possible to easily detect the position and the timing of the defect in the sample.
(Item 3)
The stress luminescence measurement method as recited in above-described Item 1, further includes a step of determining a defect occurred in the sample, based on a change in the second captured image with respect to the first captured image.

According to the stress luminescence measurement method as recited in the above-described Item 3, in the stress luminescent material after the load removal, it is possible to grasp the portion at which the external appearance is deformed with respect to the initial state (the state in which no load has been applied even once).
(Item 4)
In the stress luminescence measurement method as recited in above-described Item 3, the sample is flexible. The step of applying the load includes a step of applying a bending load to the sample. The stress luminescent measurement method further includes the steps of: acquiring a relation between stress luminescence intensity and a bending angle of the sample, based on the stress luminescence image; and identifying, by referring to the relation, the bending angle when the defect occurred.

According to the stress luminescence measurement method as recited in the above-described Item 4, since the relation between the stress generated in the sample and the bending angle of the sample can be obtained, the bending angle when the defect occurred in the sample can be detected.

(Item 5)

In the stress luminescence measurement method as recited in any one of the above-described Items 1 to 4, the step of applying the load includes a step of applying a repetition load to the sample. The step of acquiring the second captured image includes a step of acquiring the second captured image by imaging the stress luminescent material in a state in which the load has been removed, each time the repetition load of a predetermined number of times is applied.

According to the stress luminescence measurement method as recited in the above-described Item 5, it is possible to detect the generation of the defect of the sample at an early stage by observing the stress luminescent material periodically while repeatedly applying a load to the sample.

(Item 6)

A stress luminescence measurement device according to one aspect of the present invention measures luminescence of a stress luminescent material placed on a sample. The stress luminescence measurement device includes: a light source configured to irradiate the stress luminescent material with excitation light; a load application mechanism configured to apply a load to the sample; a camera configured to image the stress luminescent material; a controller configured to control the light source, the load application mechanism, and the camera; and a memory. The controller is configured to acquire a first captured image by imaging the stress luminescent material during irradiation of the excitation light. The controller is configured to acquire the stress luminescence image by imaging stress luminescence of the stress luminescent material. The controller is configured to irradiate the stress luminescent material in which the load has been removed with the excitation light. The controller is configured to acquire a second captured image by imaging, during irradiation of excitation light, the stress luminescent material in a state in which the load has been removed. The controller is configured to store the first captured image and the second captured image in the memory in association with the stress luminescent image.

According to the stress luminescence measurement device as recited in the above-described Item 6, by comparing the second captured image imaged on the stress luminescent material after the load removal and the first captured image imaged on the stress luminescent material in the original condition, it is possible to grasp the change in the appearance due to the defect of the sample. Furthermore, based on the temporal change in the stress luminescence during the load application, which is observed from the stress luminescence image associated with the first and second captured images, it is possible to detect at which timing the defect occurred in the sample.

Further, by imaging the stress luminescent material using the excitation light as the illumination light, the installation of the illumination light source for acquiring the first and second captured images is not required. Therefore, it is possible to prevent an increase in the number of components of the stress luminescence measurement device. Furthermore, since the stress luminescent material is imaged utilizing the time to excite the stress luminescent material, it is possible to prevent the time required for the stress luminescence measurement to acquire the first and second captured images from increasing.

(Item 7)

In the stress luminescence measurement device as recited in the above-described Item 6, the stress luminescent material is a marker having a pattern capable of specifying a position on a surface of the sample.

According to the stress luminescence measurement device as recited in above-described Item 7, the marker can serve as an index for identifying the timing at which the defect of the sample occurred and an index for identifying the position of the defect in the sample. This makes it possible to easily detect the position and the timing of the occurrence of the defect in the sample.

(Item 8)

In the stress luminescence measurement device as recited in the above-described Item 6 or 7, the controller is configured to determine a defect occurred in the sample, based on a change in the second captured image with respect to the first captured image.

According to the stress luminescence measurement device as recited in the above-described Item 8, since it is possible to grasp the portion at which the appearance is deformed with respect to the initial state in the stress luminescent material after the load removal, it is possible to detect the occurrence of the defect and the position at which the defect of the sample occurred.

(Item 9)

In the stress luminescence measurement device as recited in the above-described Item 8, the sample is flexible. The load application mechanism is configured to apply a bending load to the sample. The controller is configured to acquire a relation between stress luminescence intensity and a bending angle of the sample, based on the stress luminescence image and specify the bending angle when the defect occurred by referring to the relation.

According to the stress luminescence measurement device as recited in the above-described Item 9, by observing the stress luminescent material periodically while repeatedly applying a load to the sample, it is possible to detect the generation of the defect of the sample at an early stage.

(Item 10)

In the stress luminescence measurement device as recited in any one the above-described Items 6 to 9, the load application mechanism is configured to apply a repetitive load to the sample. The controller is configured to acquire the second captured image by imaging the stress luminescent material in a state in which the load has been removed, each time the repetition load of a predetermined number of times is applied.

According to the stress luminescence measurement device as recited in the above-described Item 10, by observing the stress luminescent material periodically while repeatedly applying a load to the sample, it is possible to detect the generation of the defect of the sample at an early stage.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. A stress luminescence measurement method comprising the steps of:
   placing a stress luminescent material on a surface of a sample;
   irradiating the stress luminescent material with excitation light;
   acquiring a first captured image by imaging the stress luminescent material during irradiation of the excitation light;
   applying a load to the sample;
   acquiring a stress luminescence image by imaging stress luminescence of the stress luminescent material;
   irradiating the stress luminescent material after removal of the load with the excitation light;
   acquiring a second captured image during irradiation of the excitation light by imaging the stress luminescent material in a state in which the load has been removed;
   storing the first captured image and the second captured image in a memory in association with the stress luminescent image; and
   determining a detect occurred in the sample, based on a change in the second captured image with respect to the first captured image,
   wherein the sample is flexible,
   wherein the step of applying the load includes a step of applying a bending load to the sample, and
   wherein the stress luminescent measurement method further comprising the steps of:
      acquiring a relation between stress luminescence intensity and a bending angle of the sample, based on the stress luminescence image; and
      identifying, by referring to the relation, the bending angle when the defect occurred.

2. The stress luminescence measurement method as recited in claim 1,
   wherein the stress luminescent material is a marker having a pattern capable of specifying a position on a surface of the sample.

3. The stress luminescence measurement method as recited in claim 1,
   wherein the step of applying the load includes a step of applying a repetition load to the sample, and
   wherein the step of acquiring the second captured image includes a step of acquiring the second captured image by imaging the stress luminescent material in a state in which the load has been removed, each time the repetition load of a predetermined number of times is applied.

4. A stress luminescence measurement device for measuring luminescence of a stress luminescent material placed on a surface of a sample, comprising:
   a light source configured to irradiate the stress luminescent material with excitation light;
   a load application mechanism configured to apply a load to the sample;
   a camera configured to image the stress luminescent material;
   a controller configured to control the light source, the load application mechanism, and the camera; and
   a memory,
   wherein the controller is configured to:
   acquire a first captured image by imaging the stress luminescent material during irradiation of the excitation light;
   acquire the stress luminescence image by imaging stress luminescence of the stress luminescent material;
   irradiate the stress luminescent material in which the load has been removed with the excitation light;
   acquire a second captured image by imaging, during irradiation of excitation light, the stress luminescent material in a state in which the load has been removed; and
   store the first captured image and the second captured image in the memory in association with the stress luminescent image,
   wherein the controller is configured to determine a defect occurred in the sample, based on a change in the second captured image with respect to the first captured image,
   wherein the sample is flexible,
   wherein the load application mechanism is configured to apply a bending load to the sample, and
   wherein the controller is further configured to:
      acquire a relation between stress luminescence intensity and a bending angle of the sample, based on the stress luminescence image; and
      specify the bending angle when the defect occurred by referring to the relation.

5. The stress luminescence measurement device as recited in claim 4,
   wherein the stress luminescent material is a marker having a pattern capable of specifying a position on a surface of the sample.

6. The stress luminescence measurement device as recited in claim 4,
   wherein the load application mechanism is configured to apply a repetitive load to the sample, and
   wherein the controller is configured to acquire the second captured image by imaging the stress luminescent material in a state in which the load has been removed, each time the repetition load of a predetermined number of times is applied.

* * * * *